US010909877B2

(12) United States Patent
Ihara et al.

(10) Patent No.: US 10,909,877 B2
(45) Date of Patent: Feb. 2, 2021

(54) INFORMATION PROCESSING SYSTEM AND CONTROL METHOD

(71) Applicant: SONY CORPORATION, Tokyo (JP)

(72) Inventors: Keigo Ihara, Tokyo (JP); Takahiko Sueyoshi, Tokyo (JP); Atsushi Shionozaki, Tokyo (JP); Hiroshi Iwanami, Tokyo (JP); Yasushi Miyajima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 297 days.

(21) Appl. No.: 15/551,480

(22) PCT Filed: Nov. 25, 2015

(86) PCT No.: PCT/JP2015/083133
§ 371 (c)(1),
(2) Date: Aug. 16, 2017

(87) PCT Pub. No.: WO2016/139854
PCT Pub. Date: Sep. 9, 2016

(65) Prior Publication Data
US 2018/0033331 A1    Feb. 1, 2018

(30) Foreign Application Priority Data

Mar. 2, 2015  (JP) ................. 2015-040158

(51) Int. Cl.
*A63F 9/24* (2006.01)
*G09B 19/00* (2006.01)
(Continued)

(52) U.S. Cl.
CPC .............. *G09B 19/00* (2013.01); *G06Q 50/01* (2013.01); *G06Q 50/205* (2013.01); *G09B 5/02* (2013.01); *G09B 5/04* (2013.01)

(58) Field of Classification Search
CPC .. G06K 9/00335; A61B 5/486; A61B 5/7275; A61B 5/0024
See application file for complete search history.

(56) References Cited

U.S. PATENT DOCUMENTS 6,044,292 A * 3/2000 Heyrend ............ A61B 5/04842
128/898
8,473,043 B1 * 6/2013 Modarres ........... A61B 5/04012
600/544
(Continued)

FOREIGN PATENT DOCUMENTS

JP    2004-078304 A    3/2004
JP    2007-293626 A    11/2007
(Continued)

OTHER PUBLICATIONS

International Search Report and Written Opinion of PCT Application No. PCT/JP2015/083133, dated Feb. 2, 2016, 02 pages of English Translation and 08 pages of ISRWO.

*Primary Examiner* — Omkar A Deodhar
*Assistant Examiner* — Eric M Thomas
(74) *Attorney, Agent, or Firm* — Chip Law Group

(57) ABSTRACT

Provided is an information processing system that acquires normative behavior information serving as an interaction with a specific object by a user and an evaluation value corresponding to the normative behavior information, associates and registers the normative behavior information and the evaluation value in a behavior database, and performs control such that an evaluation value of specific behavior information acquired through the communication unit is calculated using the evaluation value corresponding to the normative behavior information in accordance with a comparison result of comparing the specific behavior information with normative behavior information corresponding to the specific behavior information registered in the behavior (Continued)

database, an emotion value of the user is calculated on the basis of the calculated evaluation value, and the calculated emotion value is transmitted to an information processing device corresponding to the user who is a provision source of the specific behavior information.

13 Claims, 10 Drawing Sheets

(51) Int. Cl.
  *G06Q 50/20* (2012.01)
  *G06Q 50/00* (2012.01)
  *G09B 5/02* (2006.01)
  *G09B 5/04* (2006.01)

(56) References Cited

U.S. PATENT DOCUMENTS

| | | | |
|---|---|---|---|
| 2003/0210148 A1* | 11/2003 | Imasaki | G08B 13/2462 |
| | | | 340/573.1 |
| 2008/0169929 A1* | 7/2008 | Albertson | G08B 13/19613 |
| | | | 340/573.1 |
| 2013/0138591 A1 | 5/2013 | Ricci | |
| 2016/0363914 A1* | 12/2016 | Kim | G06F 3/015 |

FOREIGN PATENT DOCUMENTS

| | | |
|---|---|---|
| JP | 2010-518479 A | 5/2010 |
| WO | 2013/121737 A1 | 8/2013 |

* cited by examiner

INFORMATION PROCESSING SYSTEM AND CONTROL METHOD

CROSS REFERENCE TO RELATED APPLICATIONS

This application is a U.S. National Phase of International Patent Application No. PCT/JP2015/083133 filed on Nov. 25, 2015, which claims priority benefit of Japanese Patent Application No. JP 2015-040158 filed in the Japan Patent Office on Mar. 2, 2015. Each of the above-referenced applications is hereby incorporated herein by reference in its entirety.

TECHNICAL FIELD

The present disclosure relates to an information processing system and a control method.

BACKGROUND ART

Since the past, in general societies, regions, homes, and the like, there have been actions according to customs such as group norms, regulations, and etiquette, and these are handed down from adults to children. Knowledge related to such behavioral norms in human societies has been passed from one person to another person, and it has not been compiled particularly as a database.

Further, the behavioral norms in the human society exist even in network societies made up of persons interacting with each other via the Internet. For example, Patent Literature 1 discloses a system in which behaviors of users toward other users in a social network are monitored, and when a threshold value of a predetermined behavioral norm is exceeded, the behavioral norm is regarded as being violated, and a warning is given to the user as a system for rooting out unpleasant behavior in social networks.

CITATION LIST

Patent Literature

Patent Literature 1: JP 2010-518479T

DISCLOSURE OF INVENTION

Technical Problem

However, in order to determine whether or not a behavior of a user is an action according to customs, it is necessary to compile a certain amount of normative behavior information as a database in advance. Further, if it is possible to register and compile the normative behavior information as a database, it can be used for automatic discipline for users as well.

In this regard, the present disclosure proposes an information processing system and a control method which are capable of detecting interactions of users, registering them as behavioral norms, and utilizing the registered behavioral norms for discipline.

Solution to Problem

According to the present disclosure, there is proposed an information processing system, including: a communication unit configured to acquire normative behavior information serving as an interaction with a specific object by a user and an evaluation value corresponding to the normative behavior information; a registering unit configured to associate and register the normative behavior information and the evaluation value in a behavior database; and a controller configured to perform control such that an evaluation value of specific behavior information acquired through the communication unit is calculated using the evaluation value corresponding to the normative behavior information registered in the behavior database in accordance with a comparison result of comparing the specific behavior information with normative behavior information corresponding to the specific behavior information registered in the behavior database, an emotion value of the user is calculated on the basis of the calculated evaluation value, and the calculated emotion value is transmitted to an information processing device corresponding to the user who is a provision source of the specific behavior information through the communication unit.

According to the present disclosure, there is proposed a control method, including: acquiring, by a communication unit, normative behavior information serving as an interaction with a specific object by a user and an evaluation value corresponding to the normative behavior information; associating and registering the normative behavior information and the evaluation value in a behavior database; and performing, by a controller, control such that an evaluation value of the acquired specific behavior information is calculated using the evaluation value corresponding to the normative behavior information registered in the behavior database in accordance with a comparison result of comparing the specific behavior information with normative behavior information corresponding to the specific behavior information registered in the behavior database, an emotion value of the user is calculated on the basis of the calculated evaluation value, and the calculated emotion value is transmitted to an information processing device corresponding to the user who is a provision source of the specific behavior information.

Advantageous Effects of Invention

As described above, according to the present disclosure, it is possible to detect interactions of users, register them as behavioral norms, and utilize the registered behavioral norms for discipline.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
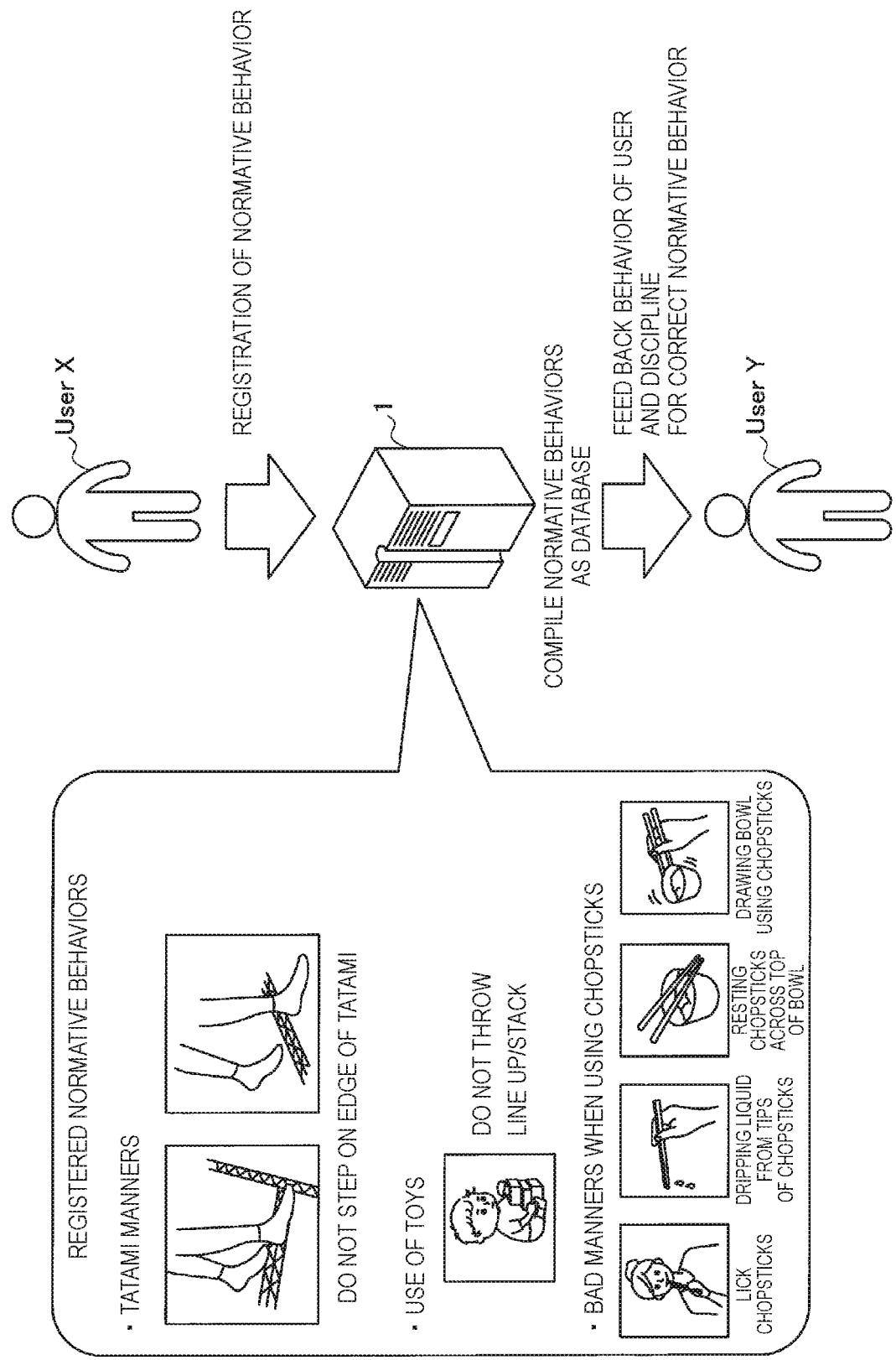
FIG. 1 is a diagram for describing an overview of an information processing system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Further, description will proceed in the following order.
1. Overview of information processing system according to embodiment of present disclosure
2. Basic configuration
2-1. Configuration of management server
2-2. Configuration of registration information processing device
2-3. Configuration of discipline information processing device
3. Operation process
3-1. Registration process with approval
3-2. Registration process without approval
3-3. Discipline process
4. Conclusion

1. Overview of Information Processing System According to Embodiment of Present Disclosure First, an overview of an information processing system according to an embodiment of the present disclosure will be described with reference to FIG. 1. The information processing system according to the present embodiment detects an interaction of a user X who is a registrant, and registers normative behaviors such as custom, manners, discipline content, and the like in a management server 1 to be compiled as a database. The normative behaviors to be detected are detected through various kinds of sensors attached to the user X or an object. Examples of various kinds of sensors include a pressure sensor, an acceleration sensor, an open/close sensor, a clock, a geomagnetic sensor, a gyro sensor, an odor sensor, a camera (a visible light camera, an infrared camera, a depth camera, or the like), a position information measuring sensor, and a biometric sensor.

As illustrated in FIG. 1, the normative behaviors such as tatami manners, use of toys, bad manners when using chopsticks, and the like are registered in the management server 1. The normative behaviors are indicated by data obtained by capturing motion of a human body in the case of good manners/bad manners, a numerical value range in the case of good manners detected by the pressure sensor, the acceleration sensor, or the like, or a numerical value range in the case of bad manners, or the like Further, it is also possible to construct a normative behavior database by registering the normative behaviors approved by an administrator of an aggregate among behaviors detected from a large number of users belonging to a specific aggregate.

Further, the management server 1 according to the present embodiment can discipline for a correct normative behavior by giving feedback for a behavior of a user Y to be disciplined using the registered normative behavior. Specifically, the management server 1 can discipline the user Y by comparing an interaction detected from the user Y with the registered normative behavior, evaluating the interaction of the user Y in accordance with a comparison result, and presenting the user Y with an emotion value calculated based on the evaluation value, the correct normative behavior, advice, or the like.

The overview of the information processing system according to an embodiment of the present disclosure has been described above. Next, an overall configuration of the information processing system of the present embodiment will be described with reference to FIG. 2.

Figure 2:
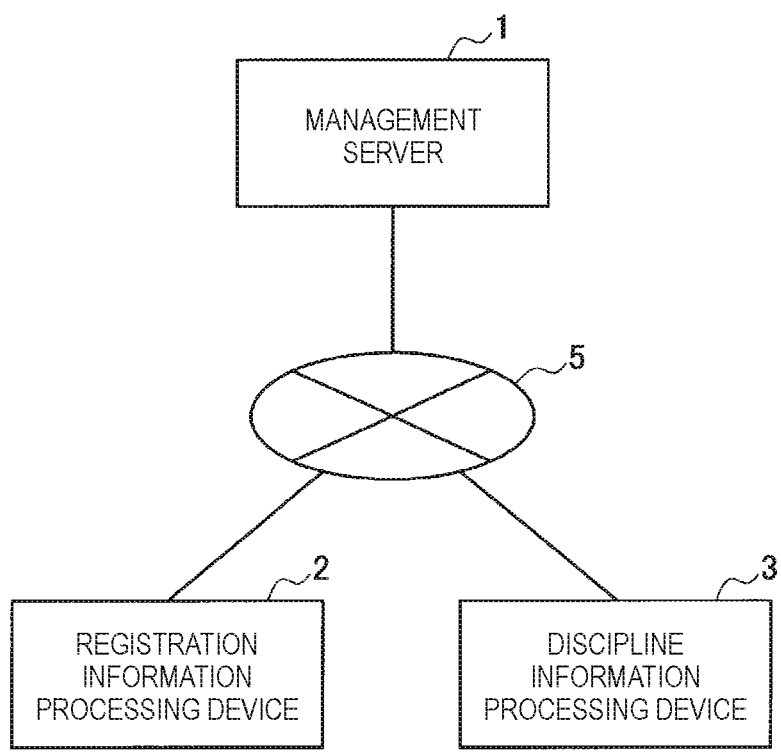
FIG. 2 is a diagram illustrating an overall configuration of an information processing system according to the present embodiment.

FIG. 2 is a diagram illustrating an overall configuration of the information processing system according to the present embodiment. As illustrated in FIG. 2, the information processing system according to the present embodiment includes the management server 1 that compiles the normative behaviors as a database, a registration information processing device 2 that registers the normative behaviors, and a discipline information processing device 3 that disciplines for the normative behaviors. Further, the management server 1, the registration information processing device 2, and the discipline information processing device 3 can be connected via a network 5.

The registration information processing device 2 detects normative behavior information serving as an interaction with a specific object by the user, transmits the normative behavior information to the management server 1, and requests the management server 1 to register the normative behavior information. For example, the registration information processing device 2 detects use of chopsticks, use of toys, how to walk on a tatami, and the like, and transmits them to the management server 1. The management server 1 accumulates the normative behavior information and constructs a normative behavior database. Further, the registration information processing device 2 can be implemented by a smartphone, a mobile phone terminal, a tablet terminal, a personal computer, a wearable device (a smart belt, a smart watch, a smart eyeglass, or an HMD), or the like.

The discipline information processing device 3 detects specific behavior information of the user and transmits the specific behavior information to the management server 1. For example, the discipline information processing device 3 detects how the user uses chopsticks, how the user uses toys, how the user walks on a tatami, or the like and transmits them to the management server 1. The management server 1 performs feedback using the behavioral norm database for the specific behavior information received from the discipline information processing device 3 and disciplines the user. Specifically, the management server 1 extracts the normative behavior information corresponding to the specific behavior information from the database, compares the extracted normative behavior information with the specific behavior information, and evaluates the specific behavior information in accordance with a comparison result. The management server 1 disciplines the user by transmitting an emotion value calculated based on the evaluation value, presentation of the correct normative behavior, advice, or the like to the discipline information processing device 3. Further, the discipline information processing device 3 can be implemented by a smartphone, a mobile phone terminal, a tablet terminal, a personal computer, a wearable device, or the like.

The overall configuration of the information processing system according to the present embodiment has been described above. Next, basic configurations of the respective devices included in the information processing system according to the present embodiment will be specifically described.

2. Basic Configuration

<2-1. Management Server>

Figure 3:
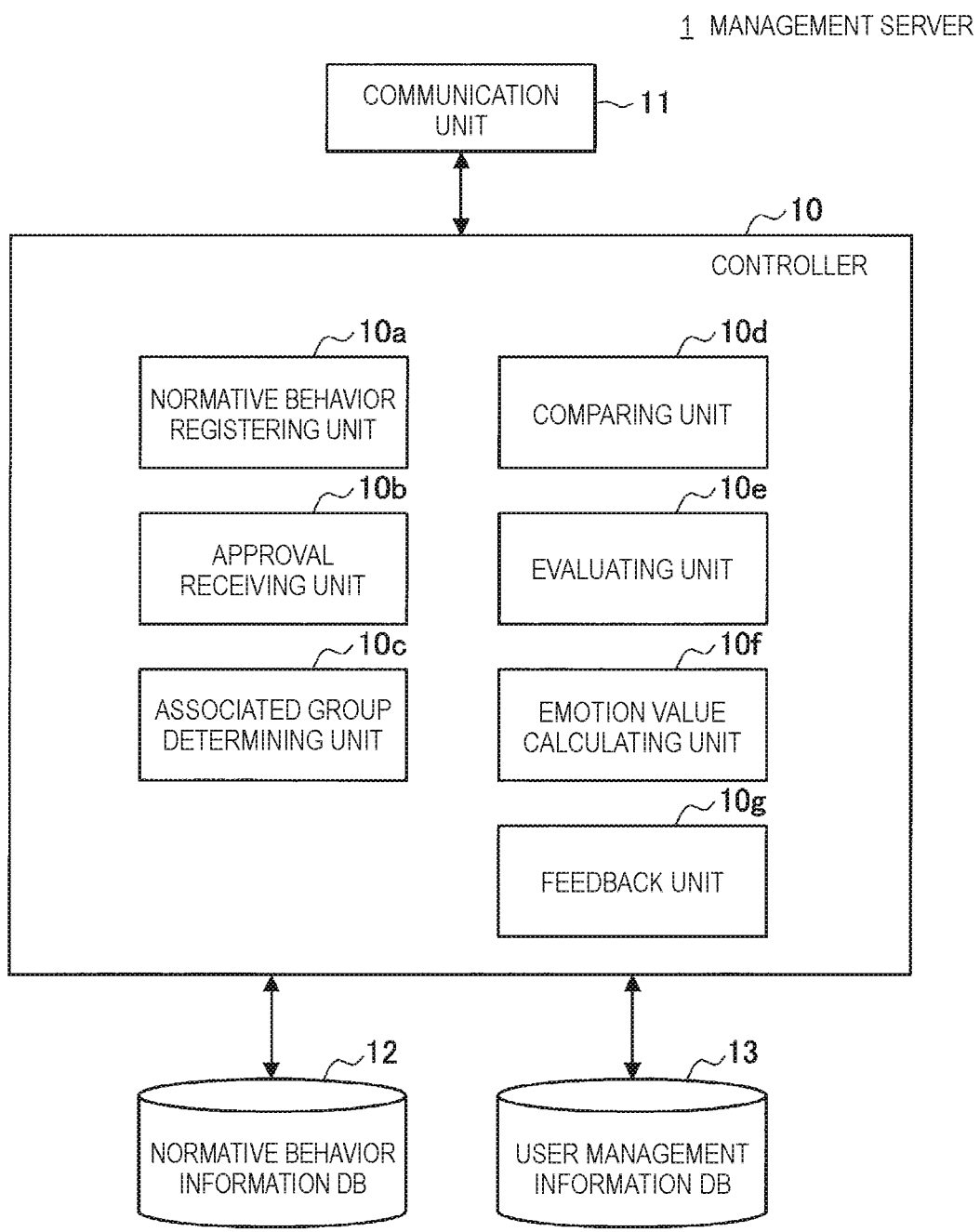
FIG. 3 is a block diagram illustrating an example of a configuration of a management server according to the present embodiment.

FIG. 3 is a block diagram illustrating an example of a configuration of the management server 1 according to the present embodiment. As illustrated in FIG. 3, the management server 1 according to the present embodiment has a controller 10, a communication unit 11, a normative behavior information database (DB) 12, and a user management information DB 13.

(Controller)

The controller 10 controls the components of the management server 1. The controller 10 is implemented by a microcomputer including a central processing unit (CPU), a read only memory (ROM), a random access memory (RAM), and a non-volatile memory. Further, as illustrated in FIG. 3, the controller 10 according to the present embodiment also functions as a normative behavior registering unit 10a, an approval receiving unit 10b, an associated group determining unit 10c, a comparing unit 10d, an evaluating unit 10e, an emotion value calculating unit 10f, and a feedback unit 10g.

The normative behavior registering unit 10a performs control such that the normative behavior information received from the registration information processing device 2 via the communication unit 11 and the evaluation value corresponding to the normative behavior information are stored in the normative behavior information DB 12. For the evaluation value, each of numerical values indicating intelligence, self-control, and cooperativeness of the user which are determined on the basis of the normative behavior as elements constituting the emotion value to be described later is given, for example, a score of −1.0 to 1.0. This is because it is possible to detect the intelligence, the self-control, or the cooperativeness of the user in accordance with whether or not the behavior of the user is consistent with the normative behavior. Each of the evaluation value may be set in the registration information processing device 2 by the registrant or the administrator.

Further, when the registrant is associated with a specific group, the normative behavior registering unit 10a may register the normative behavior information and a corresponding evaluation value in the normative behavior information DB 12 in association with the specific group.

Further, when similar normative behavior information and an evaluation value have already been registered in the normative behavior information DB 12, the normative behavior registering unit 10a registers a new evaluation value based on an already registered evaluation value and a newly acquired evaluation value.

The normative behavior registering unit 10a may temporarily store the normative behavior information transmitted from the respective registration information processing devices 2 by a plurality of registrants in the normative behavior information DB 12 and confirm registration of the normative behavior approved by an administrator having approval authority. The approval of the normative behavior is performed from the registration information processing device 2 used by the administrator and received by the approval receiving unit 10b. The approval receiving unit 10b receives the approval of the normative behavior from the registration information processing device 2 and outputs approval content to the normative behavior registering unit 10a.

The associated group determining unit 10c determines a group with which a discipline target user is associated on the basis of a user profile stored in the user management information DB 13 or information related to the user acquired from the discipline information processing device 3. An associated group is assumed to be a country, an organization, a region, a school, a family, or the like. The associated group determining unit 10c outputs the determined group of the discipline target user to the comparing unit 10d.

A case in which the user is associated with a plurality of groups is also assumed. For example, there are cases in which one user is determined to be associated with a country or region group, a school group, and a family group. Further, a group with which the user is associated may be decided dynamically. For example, the associated group determining unit 10c determines a situation in which the user is placed in accordance with a time, a position, a person with the user, or the like, and determines an optimum group at that time. Specifically, when the user is in a class at school, when the user stays at home in the evening, and when the user is learning, a group with which the user is associated is different (for example, the user is associated with a "school group," a "family group," and a "learning group"), and the normative behavior information to be applied is also different.

The comparing unit 10d compares the behavior information of the discipline target user transmitted from the discipline information processing device 3 with the normative behavior corresponding to the behavior information. The normative behavior is extracted from the normative behavior information DB 12. Further, when the normative behavior is extracted from the normative behavior information DB 12, the comparing unit 10d may extract the normative behavior stored in association with the associated group of the user determined by the associated group determining unit 10c. Accordingly, the comparing unit 10d can determine whether or not the behavior of the user conforms to manners, customs, or local rules set for each country, each organization, each region, each school, or each family. For example, when a photoelectric sensor installed at the edge of a tatami detects the user stepping on the edge of the tatami as the behavior information, the comparing unit 10d compares the behavior of the user with the correct normative behavior such as "do not step on the edge of the tatami" stored in the normative behavior information DB 12. The comparing unit 10d outputs a comparison result indicating that the behavior information of the user is different from the correct normative behavior. The comparing unit 10d outputs the comparison result to the evaluating unit 10e.

Further, when the user is determined to be associated with a plurality of groups, the comparing unit 10d performs the comparison with the behavior information of the user with reference to normative behavior tables of all the associated groups. Further, as described above, the group with which the user is associated dynamically changes in accordance with a situation of the user at that time, and thus the comparing unit 10d performs the comparison with the normative behavior associated with the group with which the user is determined to be associated at that time.

The evaluating unit 10e calculates the evaluation value of the behavior information of the user using the evaluation value corresponding to the correct normative behavior stored in the normative behavior information DB 12 in accordance with the comparison result by comparing unit 10d. In this specification, the evaluation value is a specific element constituting the emotion value to be described later. For example, when the comparison result indicating that the behavior information of the user is different from the correct normative behavior is output, the evaluating unit 10e subtracts the evaluation value associated with the correct normative behavior in accordance with a degree of difference, and calculates the evaluation value of the behavior information of the user (specifically, for example, the evaluation values indicating the intelligence, the self-control, the cooperativeness, or the like). The evaluating unit 10e stores the calculated evaluation value in the user management information DB 13 in association with the target user. Accordingly, the evaluation value based on the comparison of the behavior information of the user and the normative behavior is accumulated in the user management information DB 13. Further, the evaluating unit 10e outputs the calculated evaluation value to the emotion value calculating unit 10f.

The emotion value calculating unit 10f calculates the emotion value of the behavior information of the user on the basis of the evaluation value calculated by the evaluating unit 10e. For example, the emotion value calculating unit 10f may calculate an average value of the evaluation values indicating the intelligence, the self-control, and the cooperativeness which are given to the behavior information as the emotion value.

The emotion value calculating unit 10f can also calculate the emotion value serving as comprehensive evaluation related to the behavior information of the user using the evaluation values of the user accumulated in the user management information DB 13. For example, the emotion value calculating unit 10f adds the accumulated evaluation values indicating the intelligence, the self-control, and the cooperativeness, calculates evaluation values normalized using a MAX value=1 and a MIN value=−1, and calculates the emotion value serving as the comprehensive evaluation from the average value of the normalized evaluation values. More specifically, for example, when the normalized evaluation values are 0.75 for the intelligence, 0.5 for the self-control, and 0.8 for the cooperativeness, the emotion value calculating unit 10f calculates an average value "0.68" as the emotion value.

The feedback unit 10g transmits the emotion value calculated by the emotion value calculating unit 10f to the discipline information processing device 3 which is a transmission source of the behavior information of the user through the communication unit 11. Further, the feedback unit 10g may also transmit a rationalization of the calculated emotion value. Furthermore, the feedback unit 10g may transmit information related to the normative behavior corresponding to the behavior information to indicate a behavior to be taken to improve the evaluation values which are the elements of the emotion value. A screen displayed by the discipline information processing device 3 on the basis of the information transmitted from the feedback unit 10g will be described later with reference to FIGS. 8 and 9.

(Communication Unit)

The communication unit 11 exchanges data with an external device. For example, the communication unit 11 establishes a connection with the registration information processing device 2, receives the normative behavior information to be registered and approval by the administrator, establishes a connection with the discipline information processing device 3, and performs reception of the behavior information of the user and transmission of the emotion value of the behavior information.

(Normative Behavior Information DB)

Figure 4:
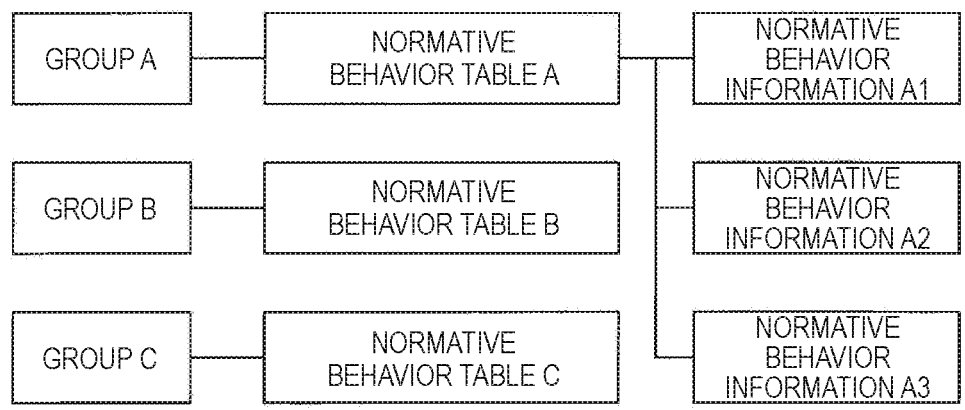
FIG. 4 is a diagram for describing a data structure of normative behavior information stored in a normative behavior information DB according to the present embodiment.

The normative behavior information DB 12 stores the normative behavior information in accordance with an instruction of the normative behavior registering unit 10a. The normative behavior information stored in the normative behavior information DB 12 may be a data structure associated with a specific group. Since each group has the normative behaviors such as the manners, the customs, the local rules, and the like in addition to common sense, it is possible to classify the normative behaviors according to each group such as a country, an organization, a region, a school, a family, or the like and register the normative behaviors for each group. FIG. 4 is a diagram for describing a data structure of the normative behavior information stored in the normative behavior information DB 12 according to the present embodiment. As illustrated in FIG. 4, there are a normative behavior table A, a normative behavior table B, and a normative behavior table C for each user group such as a group A, a group B, and a group C. Each of the normative behavior table A, the normative behavior table B, and the normative behavior table C stored in the normative behavior information DB 12 includes specific normative behavior information. For example, as illustrated in FIG. 4, the normative behavior table A includes normative behavior information A1 to normative behavior information A3. Each of the normative behavior information A1 to the normative behavior information A3 has information of the normative behavior and a corresponding emotion value.

As the normative behavior to be registered for each group in the normative behavior information DB 12, that is, as local rules, for example, the following data example may be used. The local rules shown in the following Table 1 are an example of the normative behavior information registered in the school group. When the following normative behavior is not observed, the evaluating unit 10e calculates each evaluation value by subtraction.

TABLE 1

| Local rules | Evaluation values | Emotion value |
|---|---|---|
| Wear neat clothing | Intelligence: 0, self-control: 0.25, cooperativeness: 0.5 | Total: 0.25 |
| Do not go out late at night | Intelligence: 0.5, self-control: 1, cooperativeness: 0 | Total: 0.5 |

Further, general rules such as general common sense customs and behaviors in a wide range of countries, regions, or the like are also registered in the normative behavior information DB 12. The following Table 2 is an example of the general rules.

TABLE 2

| General rules | Evaluation values | Emotion value |
| --- | --- | --- |
| Hold chopsticks correctly | Intelligence: 0.7, self-control: 0.2, cooperativeness: 0 | Total: 0.3 |
| Sit with correct posture | Intelligence: 0.25, self-control: 0.5, cooperativeness: 0 | Total: 0.25 |

(User Management Information DB)

The user management information DB 13 stores information related to the user. For example, user profile information such as a name, an age, a sex, an address, and an associated group of the user is stored.

The configuration of the management server 1 has been specifically described above. The configuration of the management server 1 illustrated in FIG. 3 is an example, and the configuration of the management server 1 according to the present embodiment is not limited to this example. For example, the normative behavior information DB 12 and the user management information DB 13 may be installed in an external storage device on the network.

<2-2. Configuration of Registration Information Processing Device>

Figure 5:
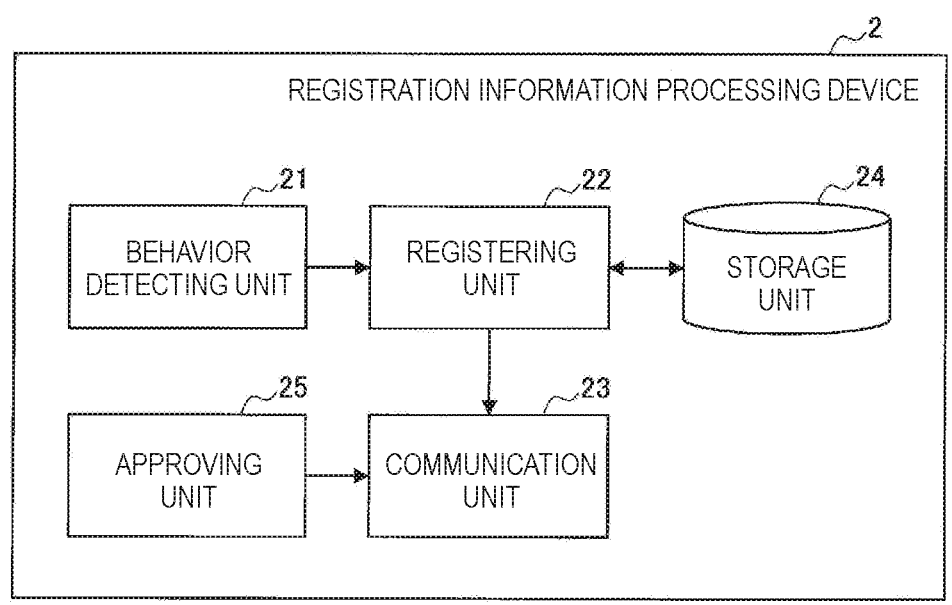
FIG. 5 is a block diagram illustrating an example of a configuration of a registration information processing device according to the present embodiment.

Next, a configuration of the registration information processing device 2 that transmits the normative behavior to the management server 1 and makes a registration request will be described with reference to FIG. 5. FIG. 5 is a block diagram illustrating an example of a configuration of the registration information processing device 2 according to the present embodiment. As illustrated in FIG. 5, the registration information processing device 2 includes a behavior detecting unit 21, a registering unit 22, a communication unit 23, a storage unit 24, and an approving unit 25.

(Behavior Detecting Unit)

The behavior detecting unit 21 acquires the normative behavior information serving as an interaction with a specific object by the user who is the registrant. For example, the behavior detecting unit 21 acquires the normative behavior information on the basis of information sensed by various kinds of sensors attached to the user or the specific object or various kinds of sensors installed around the user or the specific object. Examples of various kinds of sensors attached to the user or the specific object include a pressure sensor, an acceleration sensor, an open/close sensor, a clock, a geomagnetic sensor, a gyro sensor, a position information (for example, Global Positioning System (GPS)) measuring sensor, and a biometric sensor. Examples of various kinds of sensors arranged around the user or the specific object include an odor sensor, and a camera (a visible light camera, an infrared camera, a depth camera, or the like).

(Registering Unit)

The registering unit 22 requests the management server 1 to register the normative behavior information detected by the behavior detecting unit 21 as a norm through the communication unit 23. Further, the registering unit 22 may make the registration request in accordance with an operation of the user who is the registrant. Further, the registering unit 22 may store the normative behavior information detected by the behavior detecting unit 21 in the storage unit 24.

(Communication Unit)

The communication unit 23 exchanges data with an external device. For example, the communication unit 23 establishes a connection with the management server 1 and transmits the normative behavior information in accordance with an instruction of the registering unit 22. Further, the communication unit 23 can also transmit approval content by the administrator to the management server 1 in accordance with an instruction of the approving unit 25 to be described later.

(Storage Unit)

The storage unit 24 stores a program that enables the components of the registration information processing device 2 to function. Further, the storage unit 24 may store the normative behavior information detected by the behavior detecting unit 21.

(Approving Unit)

Figure 6:
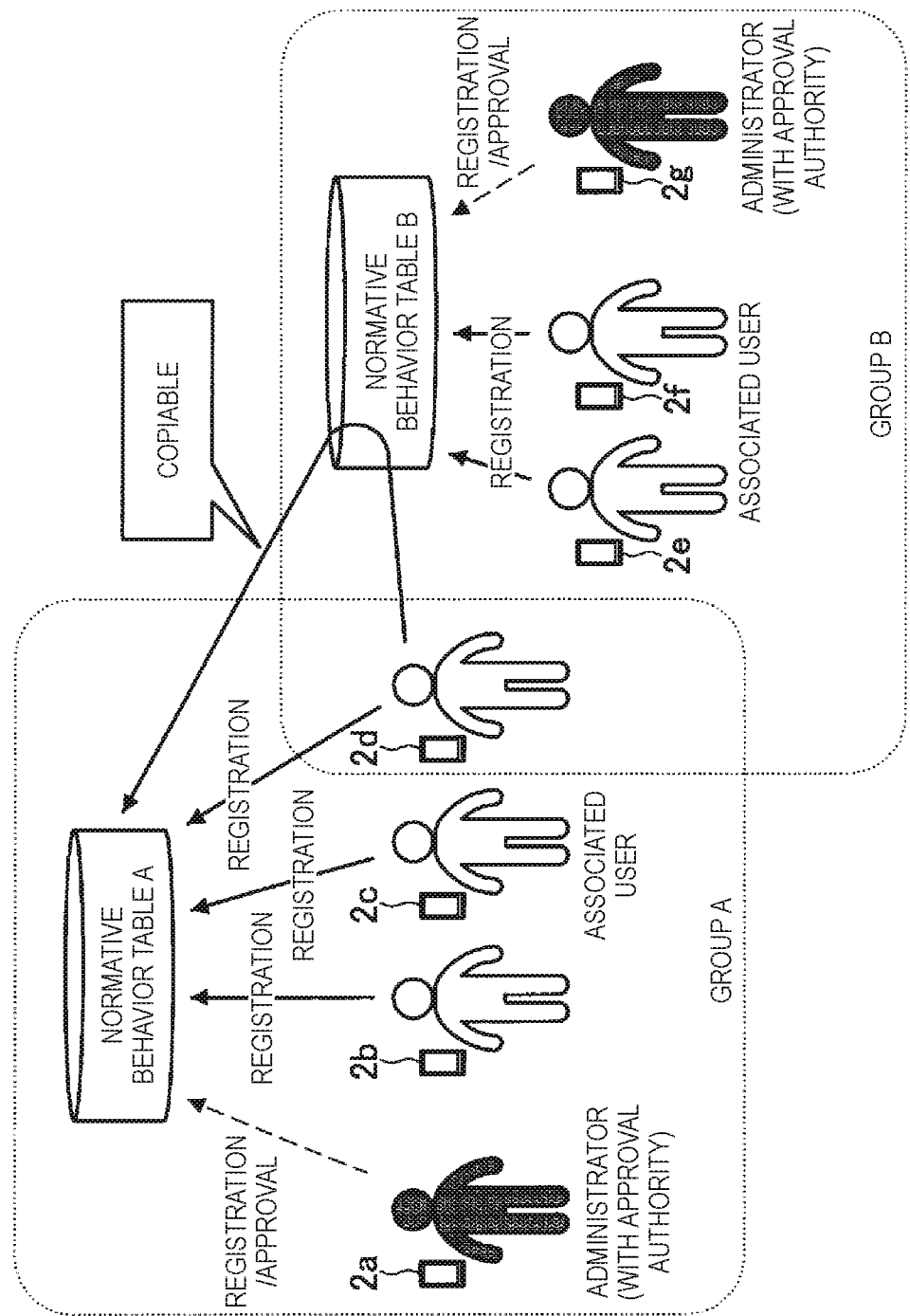
FIG. 6 is a diagram for describing registration and approval of normative behaviors for each group according to the present embodiment.

The approving unit 25 receives the approval for the normative behavior from the administrator having the approval authority and gives a notification indicating the approval of the normative behavior to the management server 1 through the communication unit 23. For example, when there is an administrator representing a specific group, the approval authority may be given to the administrator so that the administrator gives the registration approval for the normative behavior of the specific group. FIG. 6 is a diagram for describing registration and approval of the normative behavior for each group. As illustrated in FIG. 6, for example, a plurality of users (registrants) associated with a group A transmit the normative behavior information to the management server 1 using registration information processing devices 2b, 2c, and 2d and make the registration request. On the other hand, the administrator of the group A approves a behavior to be registered as the normative behavior of the group A among the normative behavior information which is transmitted from a plurality of registrants and temporarily stored in the normative behavior table A using the registration information processing device 2a. Further, the administrator of the group A can also transmit the normative behavior information to the management server 1 using the registration information processing device 2a and register the normative behavior information. A specific example is registration of school rules. A use method in which a teacher who is the administrator registers basic school rules and definitions of emotion values for them, and a student who is the user registers a new school regulation proposal decided at a student council or the like and submits it for review by the teacher may be used.

Further, when the user is associated with a plurality of groups such as the group A and the group B as illustrated in FIG. 6, it is possible to copy the normative behavior registered in one group to the other groups. In this case, the approval of the group administrator is necessary to confirm the registration. As a specific example, when the user associated with the school group is associated with an extracurricular activity group such as a tutoring school or a sports school, custom data registered in the extracurricular activity group can be copied to the school group and applied.

When the users associated with the group are in a wide range, for example, an entire country, an entire region or the like, it is also possible to conduct the normative behaviors such as the common-sense customs, the actions, and the manners without going through the approval process. Specifically, the normative behaviors registered from a plurality of associated users and the corresponding emotion values are accumulated in the normative behavior table as set values. In this case, the corresponding emotion value may be an average value of all input numerical values. In other words, when similar normative behavior information and an evaluation value are already registered in the normative behavior information DB 12, the normative behavior registering unit 10*a* registers a new evaluation value based on the already registered evaluation value and a newly acquired evaluation value.

The configuration of the registration information processing device 2 according to the present embodiment has been specifically described above. The functions of the components of the registration information processing device 2 can be implemented by a microcomputer equipped with a CPU, a ROM, a RAM, a non-volatile memory, and an interface unit mounted on the registration information processing device 2.

Further, the configuration of the registration information processing device 2 illustrated in FIG. 5 is an example, and the configuration of the registration information processing device 2 according to the present embodiment is not limited to this example. For example, when the registration information processing device 2 is used by the user (registrant) having no approval authority, the registration information processing device 2 may be configured not to include the approving unit 25.

<2-3. Configuration of Discipline Information Processing Device>

Figure 7:
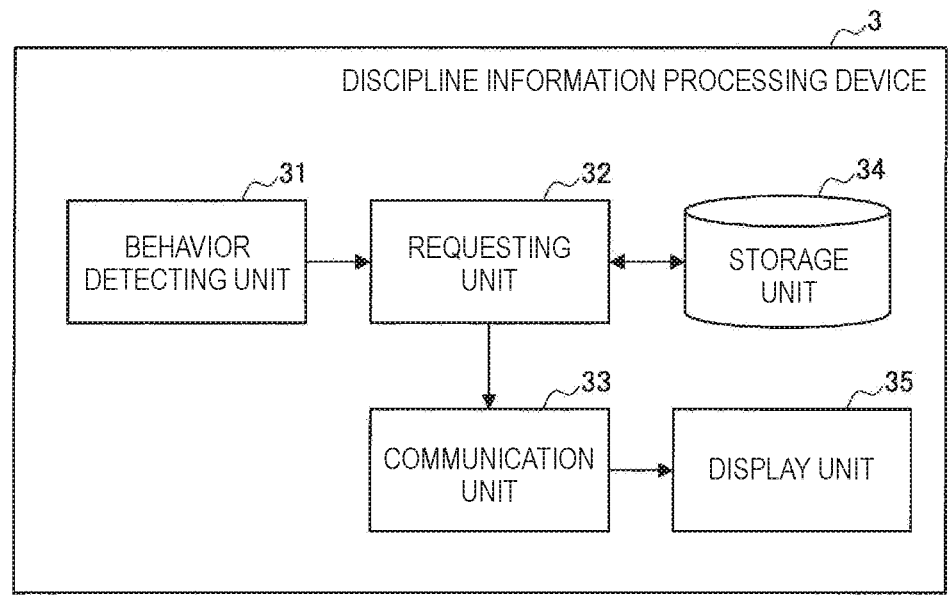
FIG. 7 is a block diagram illustrating an example of a configuration of a discipline information processing device according to the present embodiment.

Next, a configuration of the discipline information processing device 3 according to the present embodiment will be described. FIG. 7 is a block diagram illustrating an example of the configuration of the discipline information processing device 3 according to the present embodiment. As illustrated in FIG. 7, the discipline information processing device 3 includes a behavior detecting unit 31, a requesting unit 32, a communication unit 33, a storage unit 34, and a display unit 35.

(Behavior Detecting Unit)

The behavior detecting unit 31 obtains specific behavior information serving as an interaction with a specific object by the user. For example, the behavior detecting unit 31 acquires the specific behavior information on the basis of information detected by various kinds of sensors attached to the user or the specific object or various kinds of sensors installed around the user or the specific object. A specific example will be described below.

For example, positions on chopsticks at which fingers are placed are detected by pressure sensors mounted on the chopsticks, and the behavior detecting unit 31 acquires specific behavior information serving as an interaction such as the way in which the user holds the chopsticks on the basis of the detection information. Further, motion of the chopsticks is detected by the acceleration sensors mounted on the chopsticks, and the behavior detecting unit 31 acquires a behavior of waving the chopsticks or a behavior of hitting the chopsticks against a dish and causing an impact on the basis of the detection information. Further, an inclination of pressure when the user is sitting is detected by the pressure sensor mounted on a chair, and the behavior detecting unit 31 acquires a sitting posture of the user on the basis of the detection information. Further, when a change in the inclination of the pressure is detected on a time axis by the pressure sensor mounted on the chair, the behavior detecting unit 31 acquires the absence of calmness of the user on the basis of the detection information.

Further, an open/close state of a drawer, a door, or the like is detected by an open/close sensor mounted on a drawer, a door, or the like, and the behavior detecting unit 31 acquires whether or not the drawer or the door is left open on the basis of the detection information. Further, a time at which a nail clipper is used is detected by a switch type sensor or a clock mounted on the nail clipper, and the behavior detecting unit 31 acquires a time at which the user performs nail clipping on the basis of the detection information. Further, a use state of play equipment is detected by an acceleration sensor or a geomagnetic sensor mounted on the play equipment, and the behavior detecting unit 31 detects a handling state of the play equipment (rough/gentle), a direction in which the plaything is used, or the like on the basis of the detection information. Further, a placement state of shoes or an odor is detected by a geomagnetic sensor or an odor sensor mounted in the shoes, and the behavior detecting unit 31 acquires information indicating whether or not the shoes which are taken off are placed neatly or clean on the basis of the detection information.

Further, the behavior detecting unit 31 acquires information indicating whether or not the edge of the tatami is stepped on on the basis of information detected by a photoelectric sensor installed along the edge of the tatami or a camera installed in a tatami room. Further, the behavior detecting unit 31 recognizes clothing and acquires information indicating how a necktie is tied or a degree of dirtiness of shoes on the basis of a captured image captured by a camera installed in a mirror or an entrance of a room. Further, the behavior detecting unit 31 acquires information indicating whether or not a room is messy or a lot of objects are left unorganized on the basis of a captured image of the entire room captured by a camera installed in the room.

Further, motion and a position of the user are detected by an acceleration sensor or a position information measuring sensor mounted on a wristwatch or a belt for the waist, the behavior detecting unit 31 acquires information indicating whether or not the user is running in a corridor or the like or walking downtown or the like at night on the basis of the detection information.

(Requesting Unit)

The requesting unit 32 requests the management server 1 to determine whether or not the specific behavior information acquired by the behavior detecting unit 31 is consistent with the normative behavior through the communication unit 33. Further, the requesting unit 32 may make a determination request in accordance with a user operation. The requesting unit 32 may store the specific behavior information detected by the behavior detecting unit 31 in the storage unit 24.

(Communication Unit)

The communication unit 33 exchanges data with an external device. For example, the communication unit 33 establishes a connection with the management server 1 and transmits the specific behavior information in accordance with an instruction of the requesting unit 32. Further, the communication unit 33 receives the emotion value for the specific behavior information from the management server 1, information related to the normative behavior corresponding to the behavior information, and the like.

(Storage Unit)

The storage unit 34 stores a program that enables the components of the discipline information processing device 3 to function. Further, the storage unit 34 may store the specific behavior information detected by the behavior detecting unit 31.

(Display Unit)

The display unit 35 displays a menu screen, an operation screen, and the like, and is implemented by, for example, a liquid crystal display. Further, the display unit 35 displays the emotion value of the specific behavior information fed back from the management server 1, the information related to the normative behavior corresponding to the behavior information, and the like and performs discipline.

Figure 8:
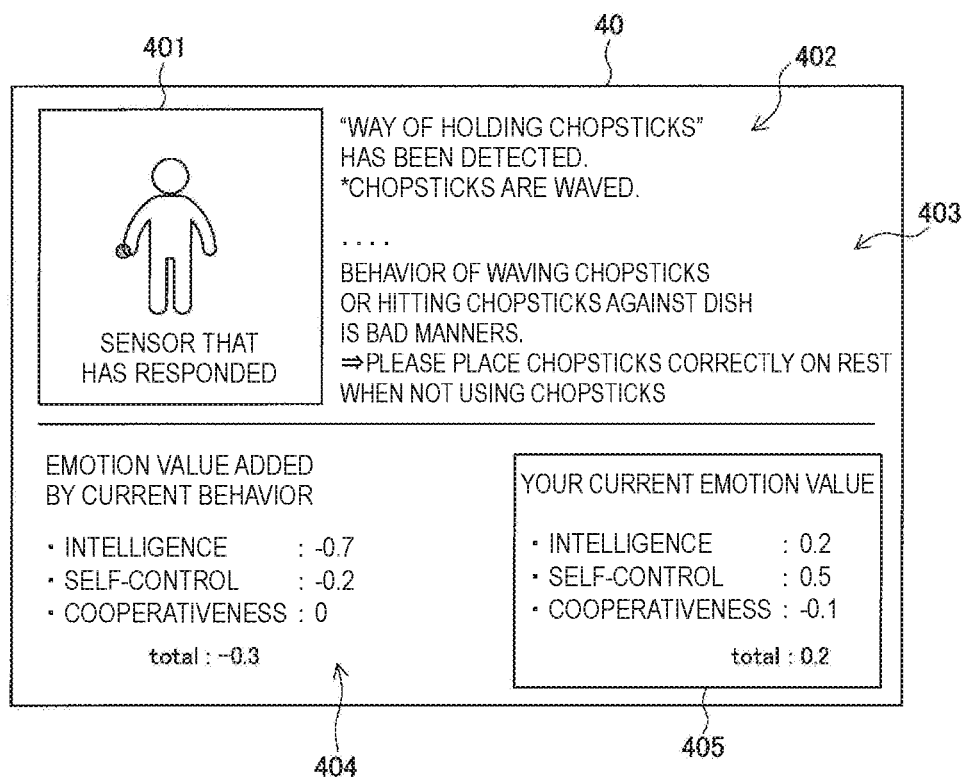
FIG. 8 is a diagram illustrating an example of a discipline screen based on feedback information according to the present embodiment.
Figure 9:
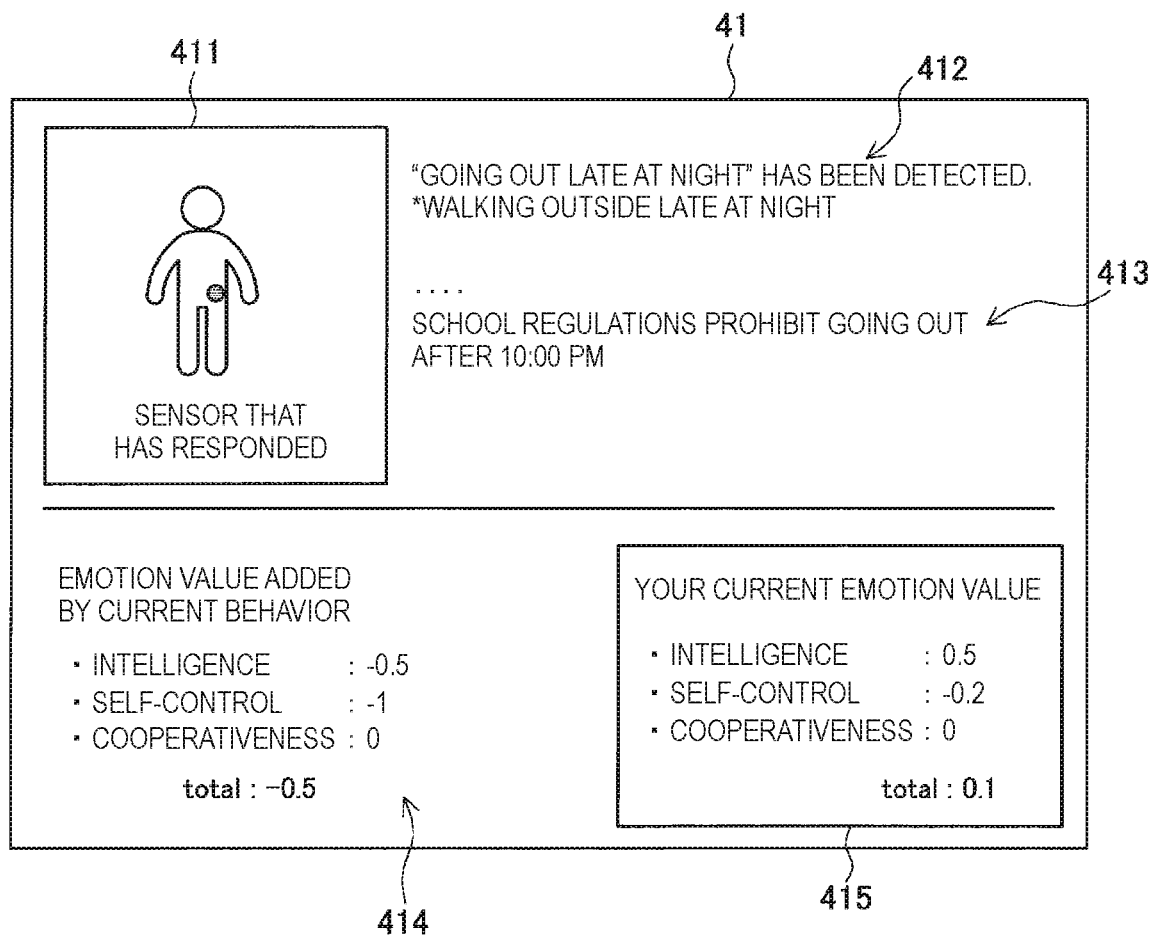
FIG. 9 is a diagram illustrating an example of a discipline screen based on feedback information according to the present embodiment.

Here, FIGS. 8 and 9 illustrate examples of a discipline screen based on the feedback information. FIG. 8 illustrates feedback content when a way in which the user uses the chopsticks is acquired as the specific behavior information. As illustrated in FIG. 8, a discipline screen 40 includes an image 401 indicating a position of a sensor that has responded, a display 402 of acquired user behavior information, a display 403 of applied normative behavior information, a detailed display 404 of an emotion value corresponding to a current behavior, and detailed information 405 of a current emotion value (comprehensive evaluation) of the user based on an evaluation value history of a previous behavior.

Further, FIG. 9 illustrates feedback content when the user going out late at night is acquired as the specific behavior information. A discipline screen 41 illustrated in FIG. 9 includes an image 411 indicating a position of a sensor that has responded, a display 412 of acquired user behavior information, a display 413 of applied normative behavior information, a detailed display 414 of an emotion value corresponding to a current behavior, and detailed information 415 of a current emotion value (comprehensive evaluation) of the user based on an evaluation value history of a previous behavior.

The user can understand which of his/her behaviors contravenes which normative behavior and which behavior is the correct normative behavior, and learn the normative behavior with reference to the discipline screens 40 and 41. Further, the user can intuitively understand whether or not understanding of customs, common-sense actions, and adherence to manners can be performed on the basis of the emotion value obtained by quantifying evaluation of his/her behavior in terms of the normative behavior.

The configuration of the discipline information processing device 3 according to the present embodiment has been specifically described above. The functions of the respective components of the discipline information processing device 3 can be implemented by a microcomputer equipped with a CPU, a ROM, a RAM, a non-volatile memory, and an interface unit mounted on the discipline information processing device 3.

Further, the configuration of the discipline information processing device 3 illustrated in FIG. 7 is an example, and the configuration of the discipline information processing device 3 according to the present embodiment is not limited to this example. For example, the discipline information processing device 3 may include a speaker and perform the discipline on the user by outputting information fed back from the management server 1 in an audio form. Further, the discipline information processing device 3 may include a microphone, and the behavior detecting unit 31 may acquire the specific behavior information of the user on the basis of a sound picked up by the microphone.

3. Operation Process

<3-1. Registration Process with Approval>

Figure 10:
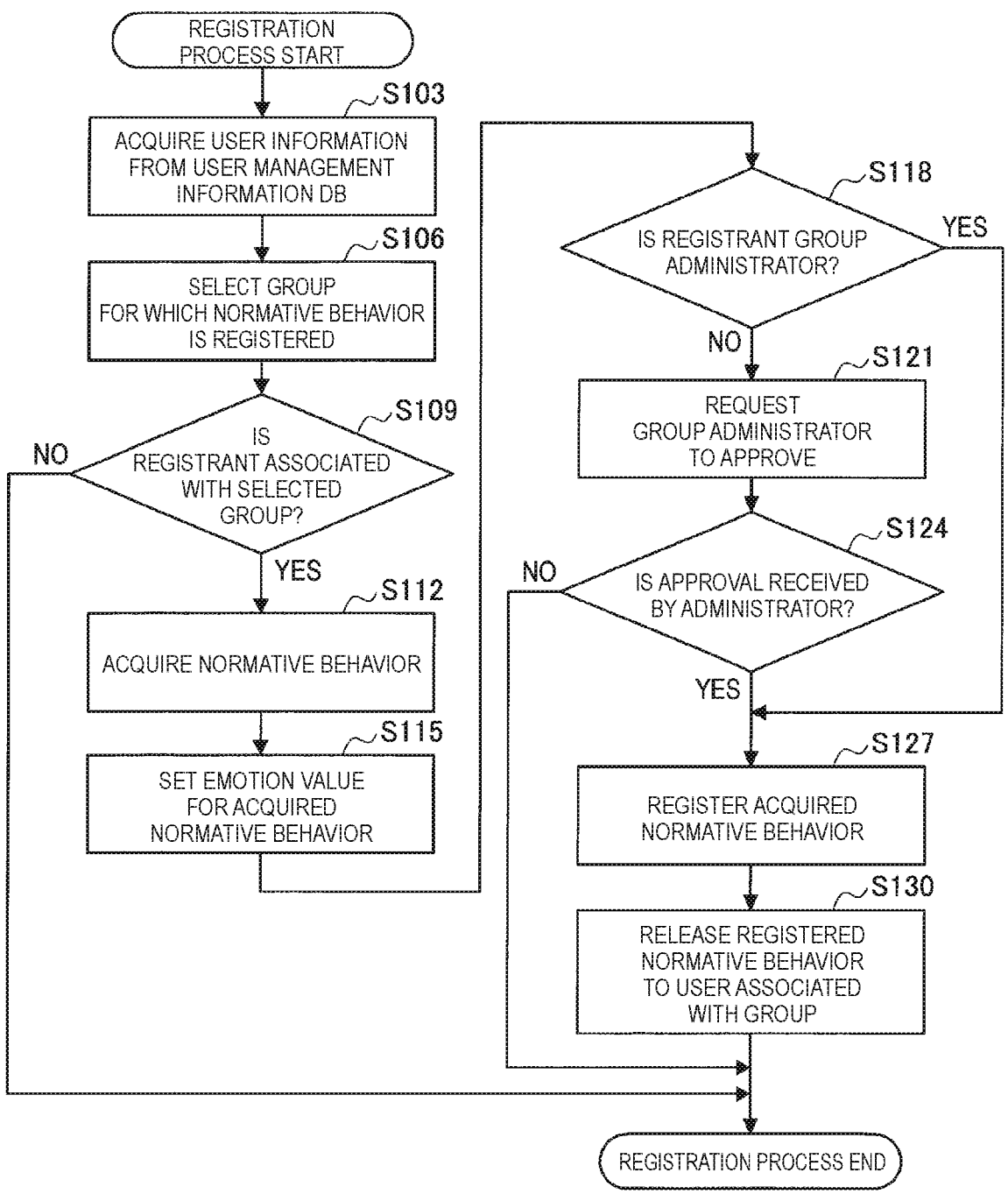
FIG. 10 is a flowchart illustrating a registration process with approval in an information processing system according to the present embodiment.

Next, an operation process of the information processing system according to the present embodiment will be described with reference to FIG. 10. FIG. 10 is a flowchart illustrating a registration process with approval in the information processing system according to the present embodiment.

As illustrated in FIG. 10, in step S103, the normative behavior registering unit 10a of the management server 1 acquires user information (a user profile) of the user (registrant) who desires to register the normative behavior using the registration information processing device 2 from the user management information DB 13.

Then, in step S106, the normative behavior registering unit 10a selects a group for which the normative behavior is registered. Specifically, for example, the registrant selects the group in the registration information processing device 2.

Then, in step S109, the normative behavior registering unit 10a determines whether or not the registrant is associated with the selected group. Specifically, the normative behavior registering unit 10a performs the determination with reference to the user information acquired from the user management information DB 13.

Then, when the registrant is assumed to be associated with the selected group ("Yes" in S109), in step S112, the normative behavior registering unit 10a acquires the normative behavior from the registration information processing device 2.

On the other hand, when the registrant is determined not to be associated with the selected group ("No" in S109), the registration process ends.

Then, in step S115, the normative behavior registering unit 10a sets the emotion value for the acquired normative behavior (that is, the evaluation values which are elements constituting the emotion value). For example, the emotion value may be input by the registrant in the registration information processing device 2.

Then, in step S118, the normative behavior registering unit 10a determines whether or not the registrant is a group administrator. Specifically, the normative behavior registering unit 10a performs the determination with reference to the user information acquired from the user management information DB 13.

Then, when the registrant is not the group administrator (No in S118), in step S121, the normative behavior registering unit 10a requests the group administrator to approve the normative behavior. The group administrator is specified with reference to the user information stored in the user management information DB 13.

On the other hand, when the registrant is the group administrator (Yes in S118), the registration request from the administrator is regarded as including the approval.

When the approval by the administrator is received by the approval receiving unit 10b ("Yes" in S124) or when the registrant is the administrator (Yes in S118), in step S127, the normative behavior registering unit 10a registers the approved normative behavior in the normative behavior information DB 12.

Then, in step S130, the controller 10 of the management server 1 releases the newly registered normative behavior to the user associated with the group. Accordingly, it is possible to inform the user associated with the group of the normative behavior.

The registration process with the approval according to the present embodiment has been specifically described above. In the operation process described above, the approval request is transmitted from the management server 1 to the group administrator in S121, but the present embodiment is not limited thereto, and for example, instead of making the request, the normative behavior may be temporarily stored as an approval waiting task, and the registration may be confirmed when the approval is given by the administrator.

<3-2. Registration Process without Approval>

Next, the registration process without the approval will be described with reference to FIG. 11. As described above, when the users associated with the group are in a wide range, for example, an entire country, an entire region or the like, it is also possible to conduct the normative behaviors such as the common-sense customs, the actions, and the manners without going through the approval process. An example in which the normative behavior is registered without going through the approval process will be described.

Figure 11:
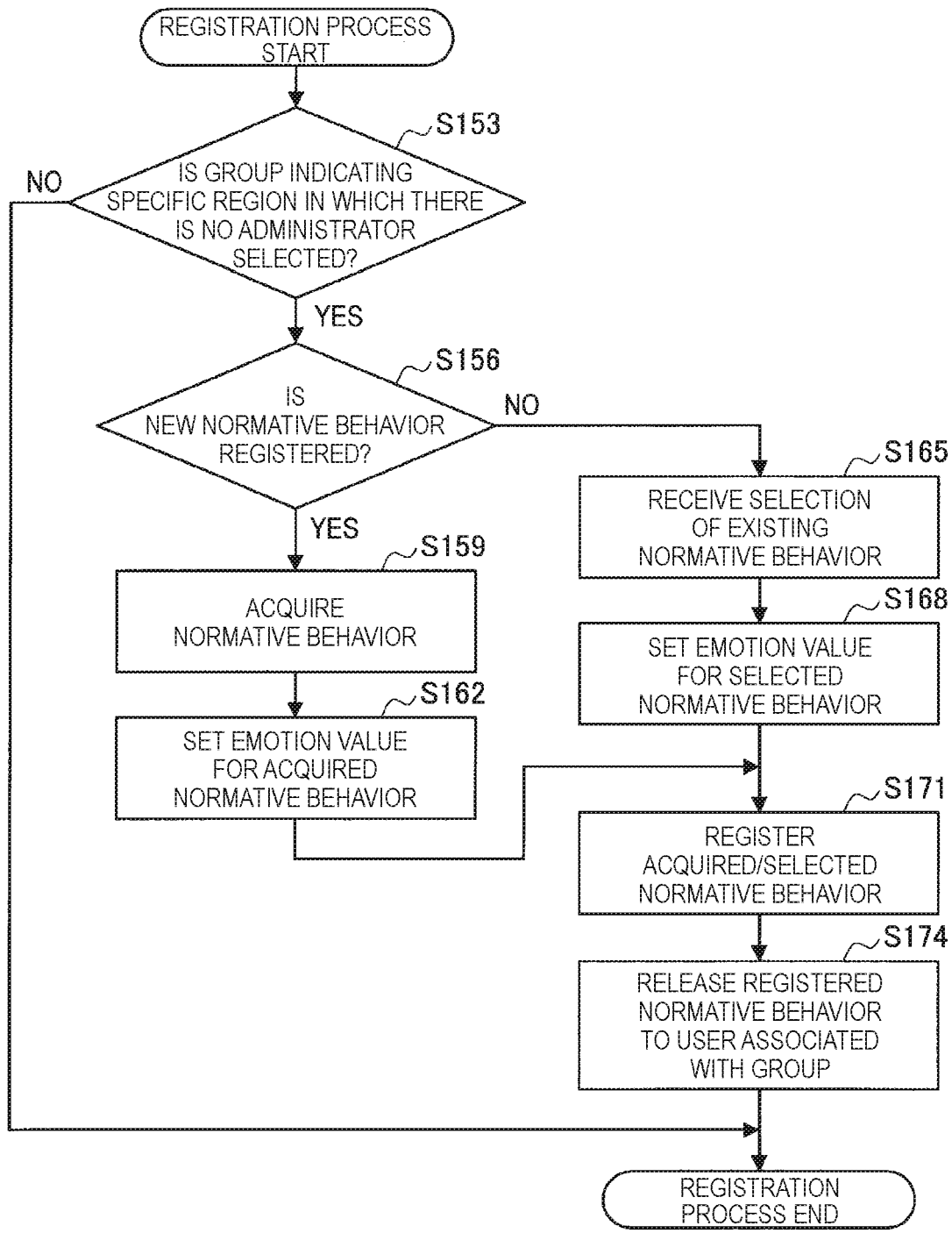
FIG. 11 is a flowchart illustrating a registration process without approval in an information processing system according to the present embodiment.

FIG. 11 is a flowchart illustrating a registration process without approval in the information processing system according to the present embodiment. As illustrated in FIG. 11, in step S153, when a group indicating a specific region in which there is no administrator is selected ("Yes" in S153), in step S156, the normative behavior registering unit 10a determines whether or not a new normative behavior is registered. The registrant selects a group in which a specified behavior is registered and whether or not a new normative behavior is registered in the registration information processing device 2.

Then, when new normative behavior is registered ("Yes" in S156), in step S159, the normative behavior registering unit 10a acquires the normative behavior from the registration information processing device 2.

Then, in step S162, the normative behavior registering unit 10a sets an emotion value for the acquired normative behavior (that is, the evaluation values which are elements constituting the emotion value). For example, the emotion value may be input by the registrant in the registration information processing device 2.

On the other hand, when a new normative behavior is not registered ("No" in S156), in step S165, the normative behavior registering unit 10a receives selection of an existing normative behavior. Specifically, the registrant may select the existing normative behavior from the normative behavior associated with the group already registered in the normative behavior information DB 12.

Then, in step S168, the normative behavior registering unit 10a sets an emotion value for the selected normative behavior. The setting of the emotion value may be an emotion value associated with an existing normative behavior or may be an emotion value newly input by registrant.

Then, in step S171, the normative behavior registering unit 10a registers the acquired/selected normative behavior in the normative behavior information DB 12.

In step S174, the controller 10 of the management server 1 releases the newly registered normative behavior to the user associated with the group. Accordingly, it is possible to inform the user associated with the group of the normative behavior.

The registration process without the approval according to the present embodiment has been described in detail above.

<3-3. Discipline Process>

Figure 12:
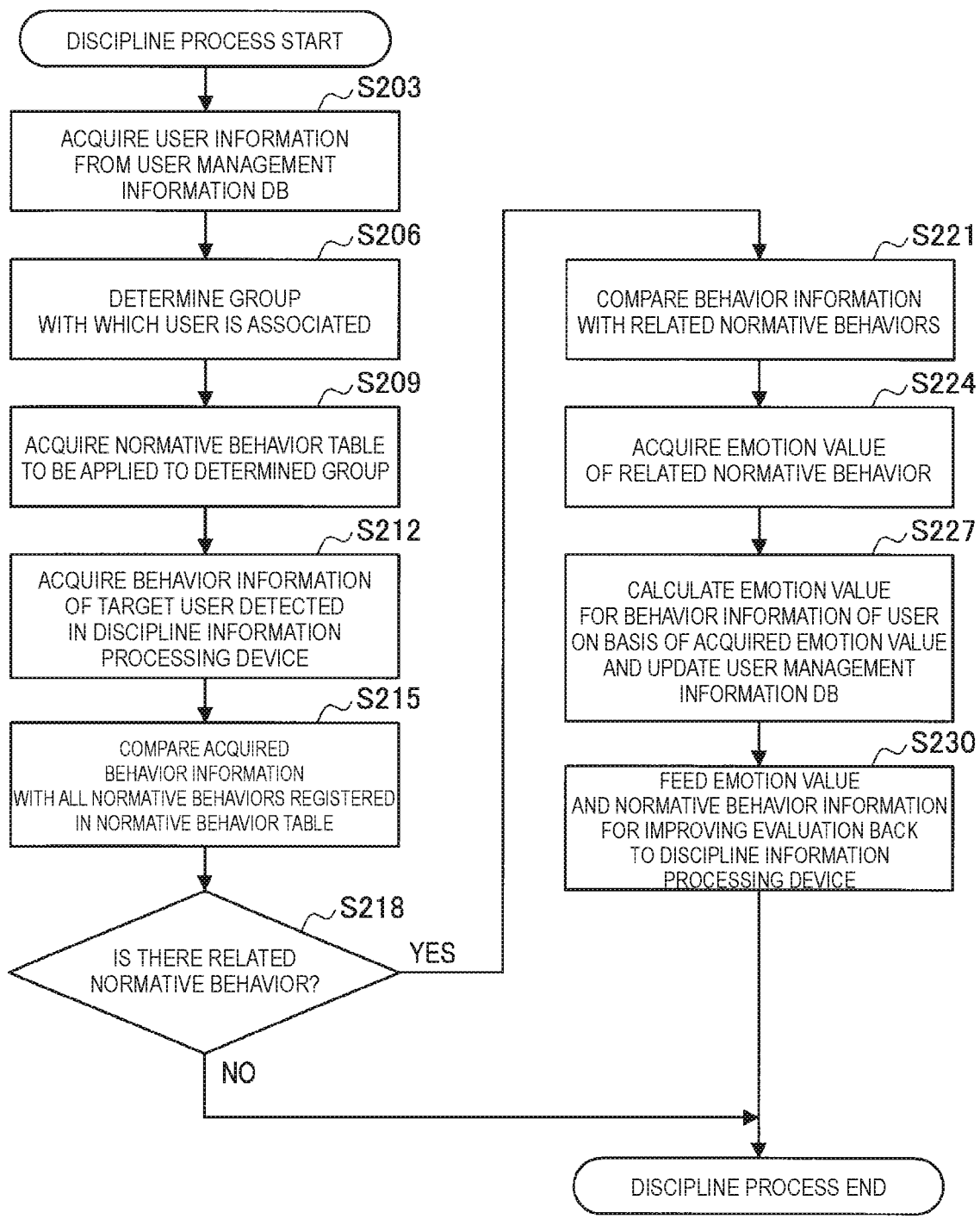
FIG. 12 is a flowchart illustrating a discipline process in an information processing system according to the present embodiment.

Next, a discipline process on the user using the registered normative behavior will be described with reference to FIG. 12. FIG. 12 is a flowchart illustrating the discipline process in the information processing system according to the present embodiment.

As illustrated in FIG. 12, first, in step S203, the associated group determining unit 10c of the management server 1 acquires the user information (user profile) of the discipline target user from the user management information DB 13.

Then, in step S206, the associated group determining unit 10c determines the group with which the discipline target user is associated. Specifically, the associated group determining unit 10c may determine a current associated group with reference to the user information acquired from the user management information DB 13 or may determine a current associated group in accordance with an environment in which the user is currently located (a time, a position, and a person with the user, or the like). For example, when the user is at school, the associated group determining unit 10c determines the school group and the country/region group to which the general common sense is applied as an associated group, and when the user is at home, the associated group determining unit 10c determines the family group and the country/region group to which the general common sense is applied as an associated group.

Then, in step S209, the comparing unit 10d acquires the normative behavior table to be applied to the group determined by the associated group determining unit 10c from the normative behavior information DB 12.

Then, in step S212, the comparing unit 10d acquires the behavior information of the target user detected in the discipline information processing device 3.

Then, in step S215, the comparing unit 10d compares the acquired behavior information with all the normative behaviors registered in the normative behavior table.

Then, in step S218, the comparing unit 10d determines whether or not there is a normative behavior related to the acquired behavior information. For example, when the acquired behavior information is the use state of the chopsticks, the comparing unit 10d extracts the normative behavior related to the use of the chopsticks from the normative behavior table to be applied to the group with which the user is associated.

Then, when there is the related normative behavior ("Yes" in S218), in step S221, the comparing unit 10d compares the behavior information of the user with the extracted related specified behaviors.

Then, in step S224, the evaluating unit 10e acquires the emotion value of the related normative behavior. The emotion value of the normative behavior is stored in the normative behavior information DB 12 in association with the normative behavior.

Then, in step S227, the emotion value for the behavior information of the user is calculated on the basis of the acquired emotion value, and the user management information DB 13 is updated. Specifically, first, the evaluating unit 10e subtracts or adds the emotion value corresponding to the normative behavior in accordance with the comparison result by the comparing unit 10d (a degree to which the behavior information of the user is consistent with the normative behavior), and calculates the evaluation values which are elements constituting the emotion value. Then, the emotion value calculating unit 10f calculates the emotion value on the basis of the evaluation values calculated by the evaluating unit 10e. At this time, the emotion value calculating unit 10f may calculate the emotion value for the current behavior and calculate a comprehensive emotion value of the user including the emotion value for the current behavior.

In step S230, the feedback unit 10g feeds the calculated emotion value and the normative behavior information for improving the evaluation back to the discipline information processing device 3. The feedback content is displayed on the display unit 35 of the discipline information processing device 3.

The discipline process according to the present embodiment has been specifically described.

<<4. Conclusion>>

As described above, in the information processing system according to the present disclosure, it is possible to detect the interaction of the user, register the interaction of the user as the behavioral norm, and utilize the registered behavioral norm for the discipline.

Further, since the normative behavior information such as the customs, the common-sense actions, the manners, the local rules, and the like is compiled as a database, all the users to whom the normative behavior information can be applied can share and understand the normative behavior information.

Further, customs that have been passed down from long ago in each region tend to be lost with the growth of nuclear families in society, but it is possible to explicitly state the implicit customs and cause them to spread in the region through the information processing system according to the present embodiment.

Further, in the present embodiment, since there are a pattern in which the approval is necessary when the normative behavior is registered and a pattern in which the normative behavior can be registered with no approval, it is possible to deal with general common sense rules which are widely applied and individual rules which are narrowly applied to families or schools.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is possible to create a computer program causing hardware such as a CPU, a ROM, and a RAM installed in the management server 1, the registration information processing device 2, or the discipline information processing device 3 to implement the functions of the management server 1, the registration information processing device 2, or the discipline information processing device 3. Further, a computer readable storage medium having the computer program stored therein is also provided.

In the above embodiment, the registration information processing device 2 and the discipline information processing device 3 have been described as different devices as illustrated in FIG. 2, but the present embodiment is not limited thereto, and an information processing device having both of the configurations may be provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing system, including:

a communication unit configured to acquire normative behavior information serving as an interaction with a specific object by a user and an evaluation value corresponding to the normative behavior information;

a registering unit configured to associate and register the normative behavior information and the evaluation value in a behavior database; and a controller configured to perform control such that an evaluation value of specific behavior information acquired through the communication unit is calculated using the evaluation value corresponding to the normative behavior information registered in the behavior database in accordance with a comparison result of comparing the specific behavior information with normative behavior information corresponding to the specific behavior information registered in the behavior database, an emotion value of the user is calculated on the basis of the calculated evaluation value, and the calculated emotion value is transmitted to an information processing device corresponding to the user who is a provision source of the specific behavior information through the communication unit.

(2)

The information processing system according to (1), in which, in a case where the user is associated with a specific group, the registering unit registers the normative behavior information and the evaluation value in association with the specific group.

(3)

The information processing system according to (2), in which the registering unit registers normative behavior information approved by an administrator of the specific group in the behavior database.

(4)

The information processing system according to (2) or (3), in which, in a case where the user who is the provision source of the normative behavior information is not an administrator, the registering unit requests approval from an administrator of the specific group.

(5)

The information processing system according to any one of (2) to (4), in which the registering unit registers normative behavior information registered in association with a group with which the user is associated in association with another group with which the user is associated in accordance with an instruction given from the user.

(6)

The information processing system according to (1) or (2)

in which, when the normative behavior information and the evaluation value are already registered in the behavior database, the registering unit registers a new evaluation value based on the already registered evaluation value and a newly acquired evaluation value.

(7)

The information processing system according to (6), in which the registering unit registers the normative behavior information in the behavior database without requiring approval of an administrator.

(8)

The information processing system according to (2), in which the controller performs control such that the normative behavior information newly registered in the behavior database is released to the user associated with the specific group.

(9)

The information processing system according to any one of (1) to (8), in which the controller calculates the evaluation value corresponding to the specific behavior information on the basis of the normative behavior information and the evaluation value associated with a specific group with which the user who is the provision source of the specific behavior information is associated, and calculates the emotion value of the user in accordance with the evaluation value.

(10)

The information processing system according to (9), in which the controller determines one or more specific groups with which the user who is the provision source of the specific behavior information is associated in accordance with at least one of user information and a current user environment.

(11)

The information processing system according to (10), in which the controller determines a group with which the user is currently associated on the basis of a current position of the user who is the provision source of the specific behavior information, or time.

(12)

The information processing system according to any one of (1) to (11), in which the controller performs control such that normative behavior information for improving an evaluation value for the specific behavior information is extracted from the behavior database and transmitted to the information processing device through the communication unit.

(13)

The information processing system according to any one of (1) to (12), in which the controller performs control such that an emotion value based on an evaluation value for the specific behavior information and a comprehensive emotion value based on an evaluation value history of the user who is the provision source of the specific behavior information are calculated and transmitted to the information processing device.

(14)

The information processing system according to any one of (1) to (13), in which the evaluation value is an element constituting the emotion value and is a numerical value indicating intelligence, self-control, or cooperativeness of the user.

(15)

A control method, including:

acquiring, by a communication unit, normative behavior information serving as an interaction with a specific object by a user and an evaluation value corresponding to the normative behavior information;

associating and registering the normative behavior information and the evaluation value in a behavior database; and performing, by a controller, control such that an evaluation value of the acquired specific behavior information is calculated using the evaluation value corresponding to the normative behavior information registered in the behavior database in accordance with a comparison result of comparing the specific behavior information with normative behavior information corresponding to the specific behavior information registered in the behavior database, an emotion value of the user is calculated on the basis of the calculated evaluation value, and the calculated emotion value is transmitted to an information processing device corresponding to the user who is a provision source of the specific behavior information.

REFERENCE SIGNS LIST 1 management server
10 controller
10a normative behavior registering unit
10b approval receiving unit
10c associated group determining unit
10d comparing unit
10e evaluating unit
10f emotion value calculating unit
10g feedback unit
11 communication unit
12 normative behavior information DB
13 user management information DB
2 registration information processing device
21 behavior detecting unit
22 registering unit
23 communication unit
24 storage unit
25 approving unit
3 discipline information processing device
31 behavior detecting unit
32 requesting unit
33 communication unit
34 storage unit
35 display unit

The invention claimed is:

1. An information processing system, comprising:
a communication unit configured to:
acquire normative behavior information and a first evaluation value, wherein
the first evaluation value corresponds to the normative behavior information, and
the normative behavior information corresponds to an interaction of a user with a specific object; and
acquire specific behavior information of the user;
a registering unit configured to register, in a behavior database, the normative behavior information and the first evaluation value in association with a first group, wherein the normative behavior information is registered in the behavior database based on an approval of the normative behavior information; and
a controller configured to:
compare the specific behavior information with the normative behavior information registered in the behavior database;
determine a second evaluation value of the specific behavior information based on the comparison and the first evaluation value,
wherein the specific behavior information corresponds to the registered normative behavior information;
determine an emotion value of the user based on the second evaluation value; and
control transmission of the emotion value to an information processing device of the user.

2. The information processing system according to claim 1, wherein
the normative behavior information and the first evaluation value are registered in association with the first group based on an association of the user with the first group.

3. The information processing system according to claim 2, wherein
the approval of the normative behavior information corresponds to an approval by an administrator of the first group.

4. The information processing system according to claim 2, wherein
the registering unit is further configured to request the approval of the normative behavior information from an administrator of the first group, and
the administrator is different from the user.

5. The information processing system according to claim 2, wherein
the registering unit is further configured to register the normative behavior information in association with a second group,
the normative behavior is registered in association with the second group based on an instruction from the user, and
the second group is associated with the user.

6. The information processing system according to claim 1, wherein
- the communication unit is further configured to acquire a third evaluation value,
- the third evaluation corresponds to the normative behavior information,
- the registering unit is further configured to register a fourth evaluation value in the behavior database based on the registered first evaluation value and the third evaluation value, and
- the fourth evaluation value corresponds to the normative behavior information.

7. The information processing system according to claim 2, wherein the controller is further configured to output the registered normative behavior information to the user associated with the first group.

8. The information processing system according to claim 1, wherein
- the controller is further configured to determine at least one group of a plurality of specific groups,
- the at least one group of the plurality of specific groups is associated with the user,
- the at least one group of the plurality of specific groups includes the first group, and
- the at least one group of the plurality of specific groups is determined based on at least one of user information or a current user environment.

9. The information processing system according to claim 8, wherein
- the controller is further configured to determine a second group of the at least one group of the plurality of specific groups, and
- the second group is determined based on one of a current position of the user or a current time value associated with the user.

10. The information processing system according to claim 1, wherein the controller is further configured to:
- extract the normative behavior information from the behavior database; and
- control transmission, via the communication unit, of the extracted normative behavior information to the information processing device.

11. The information processing system according to claim 1, wherein the controller is further configured to:
- determine a comprehensive emotion value based on an evaluation value history of the user, wherein the evaluation value history is associated with the specific behavior information; and
- control transmission of the comprehensive emotion value to the information processing device.

12. The information processing system according to claim 1, wherein
- the emotion value includes the first evaluation value, and
- the first evaluation value indicates at least one of intelligence of the user, self-control of the user, or cooperativeness of the user.

13. A control method, comprising:
- acquiring normative behavior information and a first evaluation value, wherein
  - the first evaluation value corresponds to the normative behavior information, and
  - the normative behavior information corresponds to an interaction of a user with a specific object;
- acquiring specific behavior information of the user;
- registering, in a behavior database, the normative behavior information and the first evaluation value in association with a first group, wherein the normative behavior is registered in the behavior database based on an approval of the normative behavior information;
- comparing the specific behavior information with the normative behavior information registered in the behavior database;
- determining a second evaluation value of the specific behavior information based on the comparison and the first evaluation value, wherein the specific behavior information corresponds to the registered normative behavior information;
- determining an emotion value of the user based on the second evaluation value; and
- controlling transmission of the emotion value to an information processing device of the user.

* * * * *